(12) United States Patent
Ruge

(10) Patent No.: US 12,177,280 B2
(45) Date of Patent: Dec. 24, 2024

(54) ULTRA-LOW LATENCY REMOTE APPLICATION ACCESS

(71) Applicant: Penguin Computing, Inc., Newark, CA (US)

(72) Inventor: Thomas Ruge, Denver, CO (US)

(73) Assignee: Penguin Computing, Inc., Newark, CA (US)

(*) Notice: Subject to any disclaimer, the term of this patent is extended or adjusted under 35 U.S.C. 154(b) by 0 days.

(21) Appl. No.: 18/357,466

(22) Filed: Jul. 24, 2023

(65) Prior Publication Data
US 2024/0007516 A1  Jan. 4, 2024

Related U.S. Application Data

(63) Continuation of application No. 15/147,808, filed on May 5, 2016, now Pat. No. 11,750,674.
(Continued)

(51) Int. Cl.
*G06F 15/16* (2006.01)
*G06F 3/04812* (2022.01)
(Continued)

(52) U.S. Cl.
CPC ........ *H04L 65/613* (2022.05); *G06F 3/04812* (2013.01); *G06F 3/04845* (2013.01);
(Continued)

(58) Field of Classification Search
CPC ..... H04L 67/025; H04L 65/613; H04L 65/70; H04L 61/2557; H04L 61/2517;
(Continued)

(56) References Cited

U.S. PATENT DOCUMENTS

| 5,995,102 A | 11/1999 | Rosen et al. |
| 6,005,550 A | 12/1999 | Vaughan et al. |

(Continued)

FOREIGN PATENT DOCUMENTS

| KR | 20010090291 A | 10/2001 |
| WO | 02080556 A1 | 10/2002 |

OTHER PUBLICATIONS

Bitsch, J. et al., "Ad-hoc symbiotic interactive displays through DLNA," 2012 IEEE International Conference on Pervasive Computing and Communications, Mar. 19-23, 2012, Lugano, Switzerland, IEEE, 9 pages.
(Continued)

*Primary Examiner* — Hamza N Algibhah
(74) *Attorney, Agent, or Firm* — Withrow & Terranova, P.L.L.C.

(57) ABSTRACT

An ultra-low latency remote access system may stream video images from a remote application server to a client device, but may render a cursor separately on the client device. The remote application may send cursor bitmaps and other cursor information to the client device, which may be rendered by the client device to give a near-native response time and feel to the user experience. The remote access system may operate in a browser environment, with executable code in the browser to capture user input, including pointer and keyboard inputs. Executable code on the application server may encode screen images into video, which may be transmitted and rendered on the client device. In some cases, the rendered video may be larger than the displayable area of the client device, allowing for panning and zooming to be performed on the client device.

20 Claims, 6 Drawing Sheets

Related U.S. Application Data

(60) Provisional application No. 62/218,273, filed on Sep. 14, 2015, provisional application No. 62/157,448, filed on May 5, 2015, provisional application No. 62/157,451, filed on May 5, 2015.

(51) Int. Cl.

| | |
|---|---|
| *G06F 3/04845* | (2022.01) |
| *G06F 9/54* | (2006.01) |
| *H04L 29/06* | (2006.01) |
| *H04L 65/613* | (2022.01) |
| *H04L 65/70* | (2022.01) |
| *H04L 67/025* | (2022.01) |
| *H04L 67/1004* | (2022.01) |
| *H04L 9/40* | (2022.01) |

(52) U.S. Cl.
CPC ............ *H04L 65/70* (2022.05); *H04L 67/025* (2013.01); *H04L 67/1004* (2013.01); *G06F 2203/04806* (2013.01); *H04L 63/08* (2013.01)

(58) Field of Classification Search
CPC . H04L 61/256; H04L 45/741; G06F 3/04812; G06F 2203/04806
USPC ........................................................ 709/219
See application file for complete search history.

(56) References Cited

U.S. PATENT DOCUMENTS

| | | | |
|---|---|---|---|
| 6,538,667 | B1 | 3/2003 | Duursma et al. |
| 8,867,060 | B2 | 10/2014 | Chiba |
| 8,903,897 | B2 | 12/2014 | Relan et al. |
| 9,026,635 | B2 | 5/2015 | Maity et al. |
| 9,086,837 | B1* | 7/2015 | Kang ...................... G06F 3/016 |
| 9,495,065 | B2 | 11/2016 | Thomas et al. |
| 9,563,327 | B1* | 2/2017 | Pham ...................... G06F 9/451 |
| 9,684,424 | B2 | 6/2017 | Gilboa |
| 9,781,477 | B2* | 10/2017 | Mighani ............... H04L 65/765 |
| 9,798,436 | B2 | 10/2017 | Gilboa |
| 10,176,272 | B2* | 1/2019 | Magnani ............... G06F 16/248 |
| 10,331,621 | B1* | 6/2019 | Elmore ................. G06F 16/248 |
| 11,750,674 | B2 | 9/2023 | Ruge |
| 2005/0151835 | A1* | 7/2005 | Guo ....................... H04N 7/147 |
| | | | 348/14.07 |
| 2005/0216866 | A1 | 9/2005 | Rosen et al. |
| 2006/0092268 | A1* | 5/2006 | Ahn ....................... H04N 7/147 |
| | | | 348/14.08 |
| 2007/0085825 | A1 | 4/2007 | Geffin et al. |
| 2010/0002066 | A1* | 1/2010 | Nelson .................. G11B 27/105 |
| | | | 348/E7.083 |
| 2010/0302264 | A1* | 12/2010 | Segawa ..................... G06T 3/00 |
| | | | 345/530 |
| 2011/0119723 | A1 | 5/2011 | Erickson et al. |
| 2012/0011280 | A1 | 1/2012 | Gilboa |
| 2012/0011445 | A1 | 1/2012 | Gilboa |
| 2012/0151371 | A1* | 6/2012 | Kominac ................ H04L 67/01 |
| | | | 715/740 |
| 2012/0317236 | A1 | 12/2012 | Abdo et al. |
| 2013/0018939 | A1 | 1/2013 | Chawla et al. |
| 2013/0050275 | A1* | 2/2013 | Miyamoto ............... G09G 5/08 |
| | | | 345/672 |
| 2013/0117659 | A1* | 5/2013 | Yamat .................... G06F 40/103 |
| | | | 715/234 |
| 2013/0194270 | A1* | 8/2013 | Walls ........................ G06T 1/20 |
| | | | 345/428 |
| 2013/0196760 | A1* | 8/2013 | Patel ....................... G06Q 20/04 |
| | | | 463/31 |
| 2013/0254330 | A1 | 9/2013 | Maylander et al. |
| 2013/0324099 | A1 | 12/2013 | Dgani et al. |
| 2014/0006488 | A1* | 1/2014 | Mao ........................ G06Q 10/10 |
| | | | 709/204 |
| 2014/0204026 | A1 | 7/2014 | Liu et al. |
| 2014/0260756 | A1 | 9/2014 | Holland et al. |
| 2014/0285437 | A1* | 9/2014 | Lu .......................... G06F 3/1454 |
| | | | 345/163 |
| 2014/0325367 | A1 | 10/2014 | Fear |
| 2014/0359003 | A1 | 12/2014 | Sullad et al. |
| 2014/0372509 | A1 | 12/2014 | Fausak et al. |
| 2015/0010288 | A1* | 1/2015 | Aggarwal ........... H04N 21/4622 |
| | | | 386/240 |
| 2015/0077326 | A1 | 3/2015 | Kramer et al. |
| 2015/0156203 | A1 | 6/2015 | Giura et al. |
| 2015/0160914 | A1 | 6/2015 | Oitaira |
| 2015/0181207 | A1* | 6/2015 | Agrawal ................. H04N 19/46 |
| | | | 348/189 |
| 2015/0188973 | A1* | 7/2015 | Kacmarcik ........... H04L 67/131 |
| | | | 715/719 |
| 2015/0188990 | A1* | 7/2015 | Kacmarcik .............. H04L 67/51 |
| | | | 709/203 |
| 2015/0207834 | A1* | 7/2015 | Zhao ..................... H04N 21/631 |
| | | | 709/231 |
| 2015/0212654 | A1* | 7/2015 | Beckett, Jr. ......... G06Q 30/0271 |
| | | | 705/14.67 |
| 2015/0215371 | A1 | 7/2015 | Zamir |
| 2015/0222692 | A1 | 8/2015 | Jenkins et al. |
| 2015/0365500 | A1 | 12/2015 | Liverance et al. |
| 2016/0006803 | A1 | 1/2016 | Kumar |
| 2016/0048939 | A1* | 2/2016 | Herberger ............. G06T 3/4092 |
| | | | 382/305 |
| 2016/0266784 | A1* | 9/2016 | Yu .......................... G06F 40/143 |

OTHER PUBLICATIONS

Non-Final Office Action for U.S. Appl. No. 15/147,808, mailed Jul. 27, 2018, 15 pages.
Final Office Action for U.S. Appl. No. 15/147,808, mailed Apr. 5, 2019, 15 pages.
Non-Final Office Action for U.S. Appl. No. 15/147,808, mailed Aug. 8, 2019, 16 pages.
Final Office Action for U.S. Appl. No. 15/147,808, mailed Mar. 4, 2020, 14 pages.
Non-Final Office Action for U.S. Appl. No. 15/147,808, mailed Aug. 6, 2020, 11 pages.
Applicant-Initiated Interview Summary for U.S. Appl. No. 15/147,808, mailed Feb. 4, 2021, 2 pages.
Final Office Action for U.S. Appl. No. 15/147,808, mailed Feb. 19, 2021, 13 pages.
Non-Final Office Action for U.S. Appl. No. 15/147,808, mailed May 24, 2022, 13 pages.
Final Office Action for U.S. Appl. No. 15/147,808, mailed Dec. 8, 2022, 14 pages.
International Search Report and Written Opinion for International Patent Application No. PCT/US2016/031061, mailed Aug. 16, 2016, 17 pages.
Extended European Search Report for European Patent Application No. 16790115.6, mailed Dec. 3, 2018, 7 pages.
Examination Report for European Patent Application No. 16790115.6, mailed Jun. 3, 2020, 5 pages.
Examination Report for European Patent Application No. 16790115.6, mailed Feb. 11, 2022, 6 pages.

* cited by examiner

400 METHOD FOR MANAGING CURSORS

FIG. 5   500 OVER-SIZED VIDEO TRANSMISSION FOR ZOOM/PAN SUPPORT

ULTRA-LOW LATENCY REMOTE APPLICATION ACCESS

RELATED APPLICATIONS

This application is a continuation of U.S. patent application Ser. No. 15/147,808, filed May 5, 2016, now U.S. Pat. No. 11,750,674, which claims the benefit of U.S. Provisional Patent Application Ser. No. 62/157,448, filed May 5, 2015, U.S. Provisional Patent Application Ser. No. 62/157,451, filed May 5, 2015, and U.S. Provisional Patent Application Ser. No. 62/218,273, filed Sep. 14, 2015, the disclosures of which are hereby incorporated herein by reference in their entireties.

BACKGROUND

Remote access to computer systems has been around since the original mainframe computers. The classic access method is to have dedicated hardware, such as a remote terminal, or specialized software that would run on a remote device. The software for the remote device would communicate with a server and allow bi-directional communication.

For a typical remote access system to work, the remote device would have to download and install a native client application. The native client application would capture operating system-level input, such as mouse location and keyboard inputs, and transmit the information to the application server. The application server would treat the inputs from the client application as if the user were interacting with the application server directly.

In most use cases, a remote application access system has a problem of latency, which may be perceived as responsiveness by the end user. In any remote access situation, there will be additional latencies from network connection issues.

SUMMARY

An ultra-low latency remote access system may stream video images from a remote application server to a client device, but may render a cursor separately on the client device. The remote application may send cursor bitmaps and other cursor information to the client device, which may be rendered by the client device to give a near-native response time and feel to the user experience. The remote access system may operate in a browser environment, with executable code in the browser to capture user input, including pointer and keyboard inputs. Executable code on the application server may encode screen images into video, which may be transmitted and rendered on the client device. In some cases, the rendered video may be larger than the displayable area of the client device, allowing for panning and zooming to be performed on the client device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Ultra-Low Latency Remote Application Access

Figure 1:
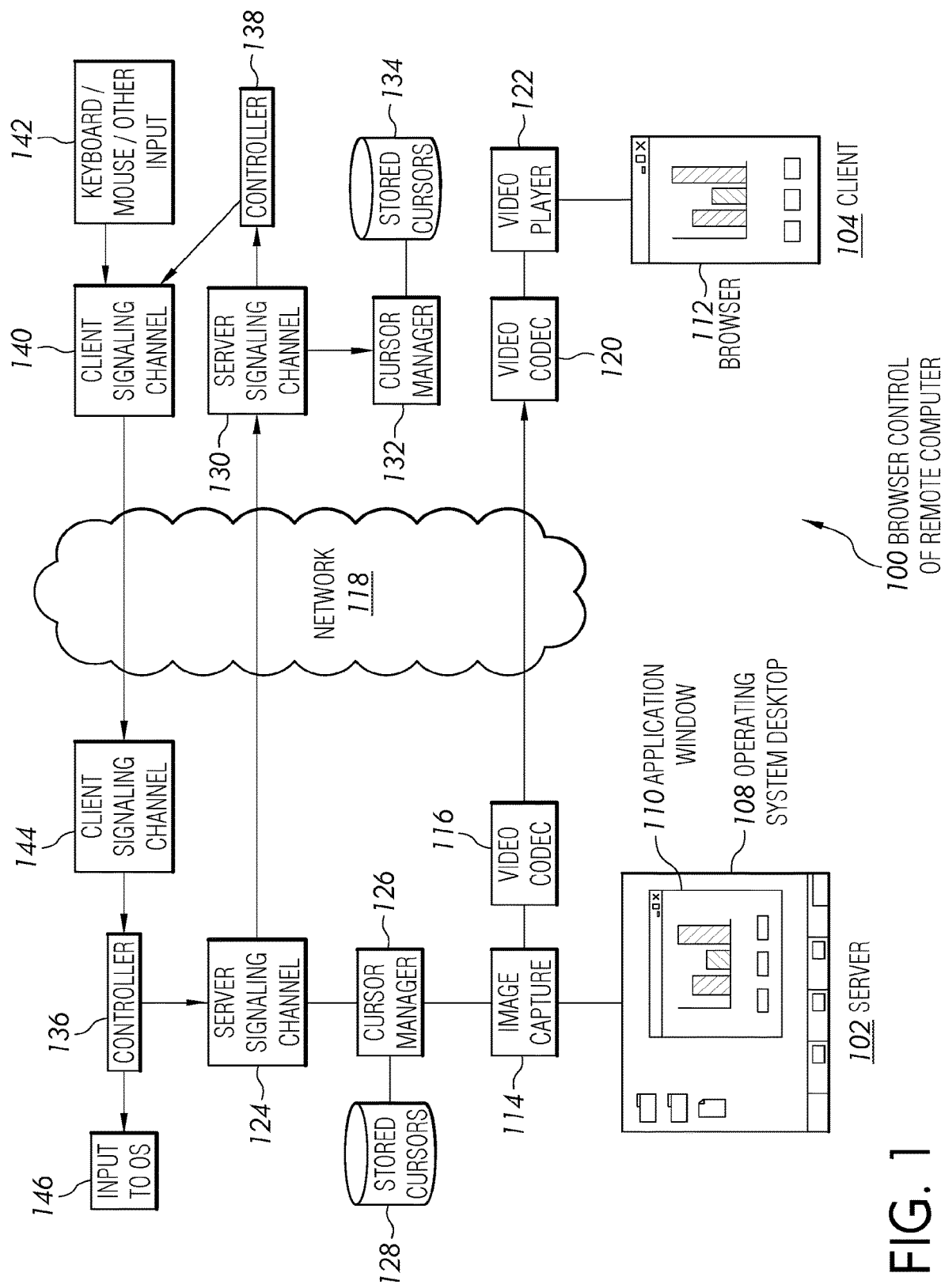
FIG. 1 is a diagram illustration of an embodiment showing browser control of a remote computer.

An ultra-low latency remote access system may stream video images from a remote application server to a client device, but may render a cursor separately on the client device. The remote application may send cursor bitmaps and other cursor information to the client device, which may be rendered by the client device to give a near-native response time and feel to the user experience.

The remote access system may give a user the experience of operating a remote application with an experience similar to having the application operating natively on the client device. By having a remote access system, a powerful remote application server may be able to process and render complex applications that would not be possible or practical to implement on a client device.

For example, a remote application server may be executing a 3D Computer Aided Design (CAD) program, which may be accessed and controlled by a tablet computer. The remote application server may have much more processing and rendering capability than the tablet computer, yet the user may interact with the 3D CAD program as if the program were running natively.

By rendering cursor movements on the client device, the user experience simulates a native application. This is because the cursor movement comes from the operating system of the client device, where the responsiveness is the same as a native application.

Compare such a system to one where cursor location information may be captured on the client device, sent to the remote server, rendered on the remote server, then the rendering transferred to the client device. In such a system, the responsiveness of the cursor may be severely limited by the round-trip travel time to the remote server and back.

Rendering the cursor natively may eliminate the round-trip lag time or latency, which can give a user a much more comfortable experience, even if the remote application image updates still have the lag time of the round-trip.

The remote access system may generate a video stream on the remote application server and transmit the video stream to a browser on the client device.

The remote application server may render images that may be captured by a remote application service. The service may generate a video stream that may be sent to the client device.

A video stream may be useful to send rendered images, as several video compression technologies can be used to compress and transmit the video stream. However, video streaming technologies are generally designed with inherent buffering technologies, any of which may add to latency. Some video compression technologies may be tuned to minimize buffering or other causes of latency.

For example, many video compression technologies may rely on differences between two or more images to eliminate the similar areas of the images. Such technologies inherently buffer multiple frames to achieve the compression goals, but in doing so introduce latency for each of the buffered frames. In a conventional video streaming situation, such latency may be immaterial, but in a real-time or near-real time system where a user may be attempting to control a remote application through a graphical user interface, such latency may be detrimental.

In many cases, video streaming may be assisted by using hardware or software codecs on the remote application server and, in some cases, on the client device. Such codecs may operate without taking much, if any, processing cycles from either a central processing unit (CPU) or graphical processing unit (GPU). In some cases, a hardware codec may not be available and a CPU or GPU may be employed for encoding or decoding a video stream.

The remote access system may operate in a browser environment, with executable code in the browser to capture user input, including pointer and keyboard inputs. The browser executable code may be JavaScript code that may be downloaded in a Hyper Text Markup Language (HTML) document.

By embedding the client-side executable code in an HTML document, any browser can be used on any device to execute any application on a remote access server. This can be done without creating, supporting, and downloading native applications that would be specific to each hardware and software platform. The client-side browser-executable code may make deploying the remote access system much easier than when using a client-side native application.

The rendered image on the remote application server may be sized to match the displayable area of a client's browser. In some cases, the rendered image may be a pixel-to-pixel match to the client device, while in other cases, the rendered image may be larger or smaller than the displayable area of the client's browser.

A pixel-to-pixel relationship between the rendered image on a remote application server and a displayable area of a client's browser may be useful in situations to maximize the resolution of the image. For example, an application that may contain small text may remain readable and useful with a pixel-to-pixel relationship.

A non-pixel-to-pixel relationship between the rendered image on a remote application server and the displayed image on a client device may be useful in several situations.

For example, a lower resolution rendered image may generate a video image that may be smaller than what may be rendered on a client device. Such systems may upscale the displayed video to match the viewable space on a client device. Such a configuration may be useful in low bandwidth situations as well as when the resolution of the image may not be of high importance. For example, a real-time action game may be rendered in a lower resolution than may be displayed as a lower resolution of the rendered image may not take away from game play.

In another example, a higher resolution rendered image may generate a video image that may be larger than what may be rendered on a client device. Such an example may be useful when the client device may be capable of panning the video while viewing, or when the client device may downscale the video image prior to viewing.

The browser-based control of a remote computer may enable a multi-user system, where one user may operate a remote computer while other users passively view the video provided from the remote computer. In some cases, two or more users may be able to control cursor movement and make cursor-related inputs to the remote computer. In some such cases, two or more users may collaborate by operating the same application on the remote device. Many such systems may have a shared audio channel, which may be delivered along with the video stream, or may be a separate channel. Some such systems may connect users through the telephone system for audio while the video and cursor controls may be provided through a digital data network connection.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

In the specification and claims, references to "a processor" include multiple processors. In some cases, a process that may be performed by "a processor" may be actually performed by multiple processors on the same device or on different devices. For the purposes of this specification and claims, any reference to "a processor" shall include multiple processors, which may be on the same device or different devices, unless expressly specified otherwise.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram illustration of an embodiment 100 showing an example system where a browser may be used to interactively control a remote computer. In the example, a server 102 may be controlled by a client 104, where an operating system desktop 108 and application window 110 may be rendered on the server, and the browser 112 may display at least a portion of the operating system desktop 108. The browser may capture and transmit keyboard, mouse, and other inputs to the server 102, which may send the inputs to the application on the server 102.

The renderings from the display of the server 102 may be captured by an image capture component 114 and encoded with a video codec 116 to create a video stream. The video stream may be passed across a network 118 to the client 104, which may receive the video stream, decode the video stream with a video codec 120, and display the video stream using a video player 112 onto the browser window.

"Real time" or "near-real time" control of an application on a server 102 by another device, in this case client 104, may introduce various complexities. Ideally, the user may make an input, such as a mouse click, keyboard input, or other input, and the user would experience instantaneous response. The fact that the two devices communicate with each other introduces latencies, as well as the availability of limited or variable network connections.

Video compression and transmission techniques are widely used, and any appropriate format, compression algorithms, codecs, and other protocols may be used. Video capture and compression mechanisms may be lossy, where some of the information may be lost during the compression routine, while other mechanisms may not be lossy.

Some of the video compression and transmission techniques may introduce latency into the system. Many video compression techniques may use data from one or more frames to compress information in later frames. Such techniques may inherently capture two, three, or more frames, perform compression using the frames, then transmit the video. One mechanism to reduce latencies may be to select a video compression and encoding technique that uses a minimum of frames during the compression process. Some video compression and encoding mechanisms may have configuration settings that may permit adjusting the encoding techniques.

Video compression mechanisms that have been successfully implemented with such a system include H262, H263, H264, and others.

A second mechanism by which user-perceived latency may be reduced may be to have cursor movement and rendering performed on the user's local device, rather than on a remote device. From the user's standpoint, the motion and feel of a cursor and its responsiveness to movement may give a perceived "real time" feel, even when the cursor inputs have a latency when they are transmitted and processed on a remote system.

Local rendering of the cursor can cause the cursor to move with the same responsiveness within a browser window as with any other application on a client device. For cursors that may be controlled with mice or other pointing device, such a responsiveness may give an acceptable experience, and in some cases, users may not realize that the operations performed within a browser window may actually be performed and rendered on a remote device.

Embodiment 100 may illustrate a system where cursor information is not included in the video transmitted from the server 102, and where the cursor information may be rendered by the client 104.

In some systems, a cursor manager 126 may be capable of removing any rendered cursor from an image captured by the image capture component 114. Some such systems may capture a bitmap of the rendered screen, identify the cursor location, and change the bitmap to remove the cursor.

In other systems, the operating system of the server 102 may be configured so that the cursor may be very small or not rendered, which may obviate the step of removing a cursor from the rendered image.

A cursor manager 126 may identify the specific cursor being used by the application or operating system of the server at a specific instance. The cursor manager 126 may transmit an image of the cursor in a bitmap or other form to the client 104. The client 104 may have a cursor manager 132 which may cause the cursor image to be rendered locally on the client 104.

Some applications may have multiple cursors that may change based on the context of the cursor, a tool that may be selected, or some other feature of the application. For example, an image editing system may have a cursor in the shape of an eyedropper for sampling colors, a bracket cursor used for editing text, a crosshair cursor for selecting a rectangular box, and so forth. Each time the cursor may be changed, the cursor manager 126 may identify the cursor and relay the cursor information over the server signaling channel 124 to the client 104.

In some cases, the cursor manager 126 may send an identifier for a specific cursor, and the client 104 may use one of several stored cursors 134 that corresponds to the identifier. Such systems may transmit an image of a cursor the first time that cursor may be encountered, then each time thereafter, may merely send the identifier instead of the image. The client 104 may have a cursor manager 132 that may cause the local cursor to change to a different cursor in response to a change in the cursor identifier.

A controller 136 on the server 102 may use a server signaling channel 124 and a client signaling channel 144 to communicate with the client 104 during setup, tear down, and normal operations. The client 104 may have a server signaling channel 130 and a client signaling channel 140 connected to a client controller 138.

The signaling channels may be illustrated here as separate communications channels. In some cases, the channels may be separate sockets, ports, protocols, or be otherwise separate from the channel through which video may be transferred. In other cases, some or all of the server signaling channel communications may be embedded or encoded into the video stream, thereby having a single port, channel, protocol, socket, or other channel from the server 102 to the client 104.

The client 104 to server 102 communications may be a separate channel, port, protocol, socket, or other mechanism than from the server signaling channel. In some cases, the client signaling channel may be a duplex version of the server signaling channel, where both directions of communication may use the same port, channel, protocol, socket, or other common mechanism.

The client 104 may have a mechanism to capture mouse, keyboard, and other input 142. These inputs may be captured and transmitted through the client signaling channel 140 to the server 102. The server 102 may receive the data through the client signaling channel, and may provide the input to the operating system 146. These inputs may be passed to the application executing within the operating system and thereby the user of the browser 112 may operate an application on the server 102.

The inputs collected on the client 104 may include any type of input, including keyboard, mouse, audio, as well as sensory input from gyroscopes, global positioning system (GPS) sensors, accelerometers, temperature sensors, pressure sensors, light sensors, and any other type of sensor that may be available on the client 104. In some cases, the inputs may include camera input that may be collected from a camera mounted on the client 104 or connected to the client 104. The camera may be able to capture still images or video, and such inputs may be transmitted over the client signaling channel 140. In the case of video or audio inputs, such inputs may be encoded using a codec and transmitted to the server 102 for decoding prior to use.

The example of embodiment 100 may illustrate a system where a browser 112 may render the contents of an application window 110. This example is merely one use case, such as where the server 102 may be configured just to provide a specific application through the browser 112. Other systems may display multiple applications and even the entire operating system desktop 108 in the browser 112. Such applications may allow for the entire server 102 to be controlled by the client 104 through the browser 112.

Figure 2:
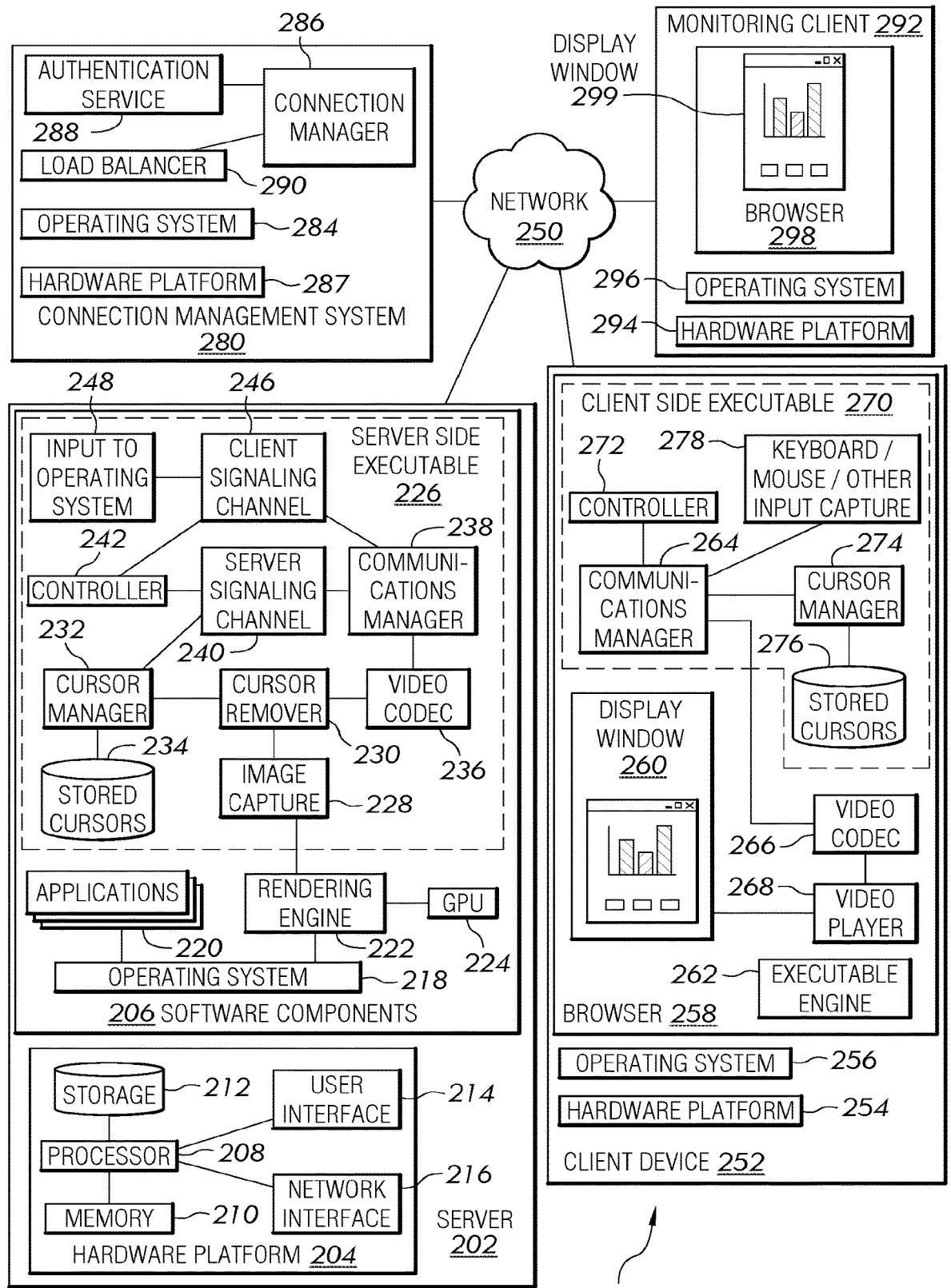
FIG. 2 is a diagram illustration of an embodiment showing a network environment with browser control of a remote computer.

FIG. 2 is a diagram of an embodiment 200 showing components that may be used for remote access of an application or system through a browser.

The diagram of FIG. 2 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a device 202 that may have a hardware platform 204 and various software components. The device 202 as illustrated represents a conventional computing device, although other embodiments may have different configurations, architectures, or components.

In many embodiments, the device 202 may be a server computer. In some embodiments, the device 202 may still also be a desktop computer, laptop computer, netbook computer, tablet or slate computer, wireless handset, cellular telephone, game console or any other type of computing device. In some embodiments, the device 202 may be implemented on a cluster of computing devices, which may be a group of physical or virtual machines.

The hardware platform 204 may include a processor 208, random access memory 210, and nonvolatile storage 212. The hardware platform 204 may also include a user interface 214 and network interface 216.

The random access memory 210 may be storage that contains data objects and executable code that can be quickly accessed by the processors 208. In many embodiments, the random access memory 210 may have a high-speed bus connecting the memory 210 to the processors 208.

The nonvolatile storage 212 may be storage that persists after the device 202 is shut down. The nonvolatile storage 212 may be any type of storage device, including hard disk, solid state memory devices, magnetic tape, optical storage, or other type of storage. The nonvolatile storage 212 may be read only or read/write capable. In some embodiments, the nonvolatile storage 212 may be cloud based, network storage, or other storage that may be accessed over a network connection.

The user interface 214 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 216 may be any type of connection to another computer. In many embodiments, the network interface 216 may be a wired Ethernet connection. Other embodiments may include wired or wireless connections over various communication protocols.

The software components 206 may include an operating system 218 on which various software components and services may operate.

Various applications 220 may execute within the operating system environment. Some or all of the applications 220 may be made available for remote control through a client device 252 and a browser 258.

The operating system 218 may have a rendering engine 222 which may render displayable images based on input from the operating system 218 and various applications 220. The rendering engine 222 may be an operating system function that may use a graphics processing unit 224, which may be a hardware or software accelerator that may assist in rendering graphics.

The server 202 may have a server side executable 226, which may be a set of software components that may permit external control of the entire system or a subset of the system through a client device 252. The server side executable 226 is illustrated as a set of software components as a matter of convenience, but some or all of the components may be implemented in hardware.

An image capture component 228 may capture the rendered images from the rendering engine 222. The image capture component 228 may be an operating system function in some systems or may be a separate component that may intercept rendered images that may be displayed on a monitor.

A cursor remover component 230 may be used in systems that may render a cursor within the displayable image. Some systems may not have a cursor remover component 230 and may include the rendered cursor in the video stream. In such a case, the client device 252 may or may not have a separately rendered cursor.

When the video stream includes a rendered cursor and when the client device also has a separately rendered cursor, a user may experience two cursors on the screen. The cursor rendered on the server 202 and embedded in the video stream may not be as responsive as the cursor rendered by the client 104, however, in most cases, the client-rendered cursor may overlap or hide the server-rendered cursor. A user may experience that the server-rendered cursor may slightly lag behind the movement of the client-rendered cursor.

A server 202 may render a cursor and the client device 252 may be configured not to render a cursor over the browser 258. In such a case, the user interaction with the browser 258 may generate a location where a cursor may be at any given time, and the location may be transmitted to the server 202, then rendered in the video stream viewed on the client device 252. Such systems may have some latency or lag that may be experienced by the user of the client device 252. In cases where the network and video processing latencies are not exceptionally high, the user experience may still be acceptable.

A server 202 may be configured to not render a cursor at all in the image generated by the rendering engine. In such cases, the rendered image may not have a cursor, so the only cursor a user of the client 252 may experience may be the cursor rendered by the client 252.

An image sequence from the image capture component 228 may be sent to a video codec 236 and then communicated to the client device 252 by a communications manager 238.

The communications manager 238 may handle a server signaling channel 240, which may send control information and other information to the client device 252.

The server signaling channel 240 may be used to send cursor information to the client device 252. The cursor information may include the location of a cursor as well as the type of cursor being displayed. The cursor type may be an identifier for a specific cursor. The server signaling channel 240 may also be used to send a bitmap or other image of a cursor for rendering on the client device 252. In some cases, the client device 252 may request a cursor image when a specified cursor may not be available on the client device 252, and the cursor manager 232 may be able to send the requested cursor from a group of stored cursors 234.

A controller 242 may manage various administrative functions for the client/server interaction. The administrative functions may include setup and teardown of a session, monitoring and adjustment of communications settings, and other functions. The controller 242 of the server 202 may operate in conjunction with controller 272 of the client, and in some cases, either controller 242 or 272 may initiate or respond to one of the various administrative functions.

During setup and teardown of a communications sessions, some use cases may have controllers 242 or 272 provide authentication and configuration of a session. In some scenarios, a client device 252 may request a connection from the server 202 or may be routed to a server 202 after making a request to a third device, such as a connection management system 280.

When a connection request is received, the controller 242 may set up the applications 220 prior to establishing a video stream. In some cases, a new instance of an application may be established and, when the instance becomes stable, a video stream may be created. In some such cases, a single server 202 may provide separate video connections to multiple devices, each device having a separate session with different instances of an application or with multiple devices sharing the same instance or session with a single instance of an application.

A setup operation may involve starting a new instance of an application and configuring the application based on parameters or data that may be provided with a request for a new session. For example, an application may be configured to resume operations from a previously saved session, or may be started with a set of options requested by a user.

Teardown of a session may involve terminating an application instance or reconfiguring the server 202 in some manner in preparation for a new session. In some cases, the server 202 may maintain its configuration and various application instances in case the session termination was inadvertent. In other cases, the server 202 may terminate one or more applications and free up resources for new sessions that may be requested at a later time.

The controllers 242 and 272 may monitor and adjust communications settings due to network or other performance issues. For example, the controllers may identify a change in the network bandwidth, and may be able to adjust the video or other communications to take advantage of additional bandwidth or reduce transmissions to accommodate less bandwidth. The video communications may be adjusted by changing the video frame rate, density or compression of pixels within the images, or other parameter changes. The specific changes may depend on the specific video compression and encoding algorithm.

The controllers 242 and 272 may be able to monitor and display connection quality and responsiveness to an end user, such as displaying a red/yellow/green light or bar graph for connection strength. When a connection problem may be recognized, the controllers may be able to present a dialog box, warning, notice, or other message on the user's screen on the browser 258.

The client signaling channel 246 may handle inbound communications from the client device 202. One element of inbound communications may be keyboard/mouse input 278 as well as other input captured by the client device's browser 258. These inputs may be communicated from the communications manager 264 on the client device 252 to the communications manager 238 on the server 202 and the client signaling channel 246. These inputs may be transferred as inputs to the operating system 248.

The keyboard/mouse input 278 may include any type of input captured by the client device 252. These inputs may include audio, video, Global Positioning System (GPS), accelerometer input, orientation sensors, temperature and pressure sensors, and any other type of input that may be captured by the client device 252. In some cases, the input may be data gathered by or presented by applications executing on the client device 252 or accessed through the network 250 to some other device. For the sake of convenience, the term keyboard/mouse input 278 includes all of the various inputs listed above.

The client device 252 may have a hardware platform 254 on which an operating system 256 may operate. The hardware platform 254 may include any of the various options and characteristics described for the hardware platform 204. A browser 258 may execute on the operating system 256.

The browser may have a display window 260, as well as an executable engine 262. The executable engine 262 may be a virtual machine, emulator, interpreter, compiler, or any other mechanism by which instructions may be executed. In today's browser technologies, many browsers include a Javascript engine that may execute Javascript that may be contained in an HTML document that a browser 258 may render.

Incoming video data may be decoded by a video codec 266 and shown on the browser's display window 260 by a video player 268. In many cases, a video player 268 may include controls for starting, stopping, rewinding, fast forwarding, or other functions. In some cases when the browser may be used to control a remote device, such as the server 202, such controls may be turned off or otherwise unavailable to the user.

A client side executable 270 may contain code that may be executed on the browser's executable engine 262. The client side executable 270 may be downloaded as part of an HTML page, and in some instances, the components of the client side executable 270 may be embedded in Javascript or some other executable language.

The client side executable 270 may include a controller 272, a communications manager 264, a cursor manager 274, and stored cursors 276. The client side executable 270 may include routines or other components that may capture keyboard/mouse inputs 278.

The cursor manager 274 may determine which cursor is to be shown at a particular time. The cursor manager 274 may receive a bitmap or other image of a cursor and store the image in a set of stored cursors 276. In many cases, the cursor manager 274 may receive an identifier which may identify the current cursor. The identifier may be any type of identifier, such as a set of numbers, letter, hashed values, or other identifier. The cursor manager 274 may look up the corresponding cursor image from the stored cursors 276, and may pass the cursor image to the browser 258 for rendering.

In some cases, a certain cursor may be applicable to a specific area of a rendered application, while a second cursor may be applicable to a different area of the rendered application. In such cases, the cursor manager 274 may receive a map or boundary area identifying a specific cursor to use while other areas of a displayed video image may have a different cursor. Some applications may have several cursor images that may apply to different areas or zones of a rendered video image.

The network 250 may be any type of network that may allow the server 202, client device 252, and other devices to communicate.

A connection management system 280 may be a device that may help set up sessions between client devices and servers. The connection management system 280 may operate on a hardware platform 282 with an operating system 284. A connection manager 286 may receive an inbound request from a client device 252 for a session. The connection manager 286 may use an authentication service 288 to determine whether or not the requestor may have permission to establish a session. Provided that the authentication is successful, a load balancer 290 may select between multiple instances of a server 202 to direct the client to establish a session.

In some cases, the connection manager 286 may setup and configure an application 220 on a server 202 specifically for an inbound request, then give the address of a server 202 for establishing a connection.

Some servers 202 may be configured so that multiple client devices may connect to a single session. In some such cases, one or more client devices may be configured to provide input to an application executing on the server 202, while other client devices may be configured to merely monitor, watch, or view the display window without providing control to the window. In some cases, control of an application on a server 202 may be changed from one device to another.

A monitoring client 292 may have a hardware platform 294 on which an operating system 296 may operate. A browser 298 may connect to the communications manager 238 and may render a display window 299, which may be the same image as rendered on the browser 258 of the client device 252. In some cases, certain inputs may be received from the monitoring client 292, such as audio, keyboard, mouse, or other inputs, and may be transmitted to the server 202. Such inputs may be transmitted as inputs to the operation system 248, although in other instances, some of the inputs generated by monitoring client 292 may be transmitted to the client device 252 for rendering and display within the browser 258.

Figure 3:
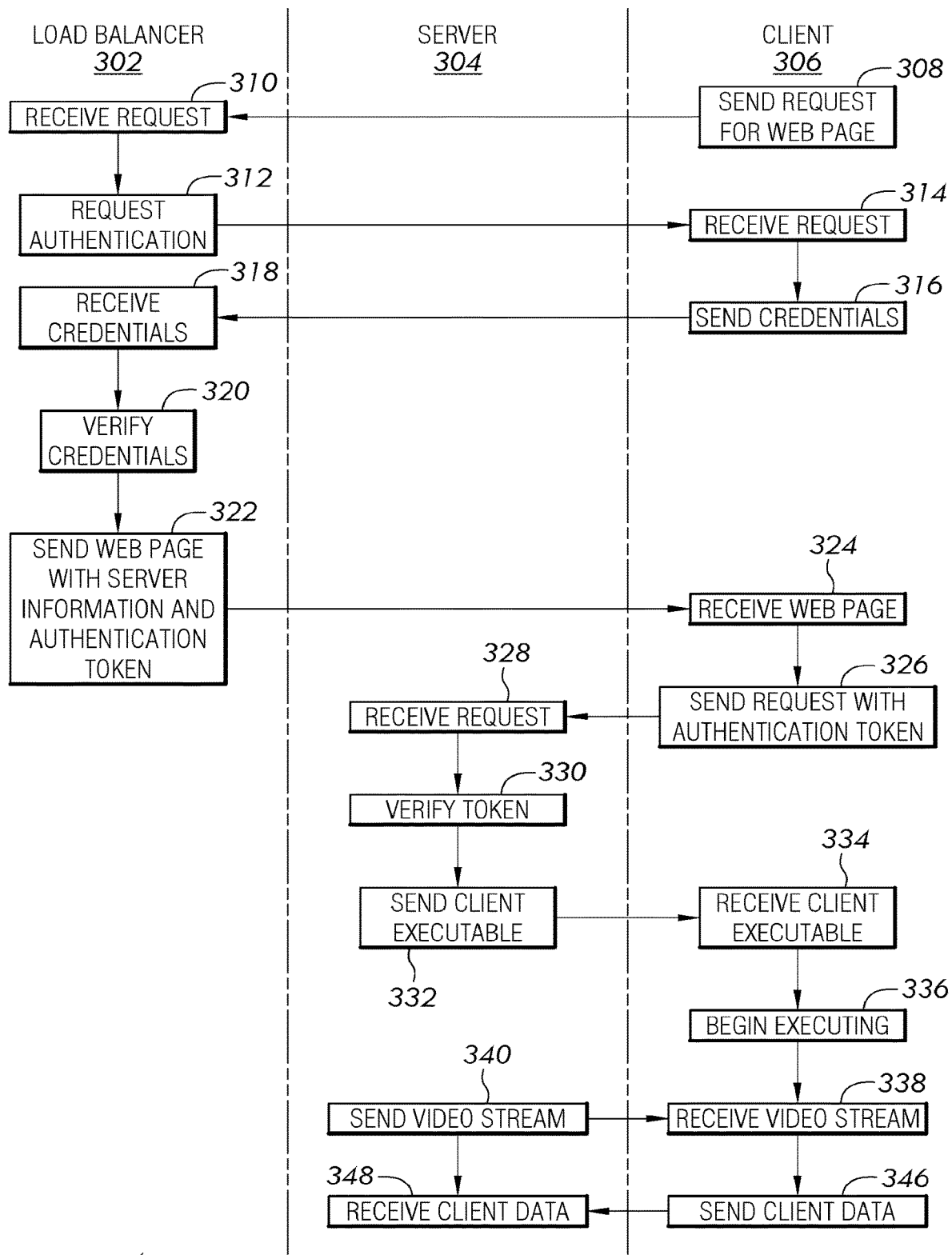
FIG. 3 is a flowchart illustration of an embodiment showing a method for setting up a communications session.

FIG. 3 is a flowchart illustration of an embodiment 300 showing a method of setting up a communications session. Embodiment 300 is a simplified example of a sequence showing a load balancer 302 in the left hand column, a server 304 in the center column, and a client 306 in the right hand column.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

Embodiment 300 may illustrate one method by which a new session may be created. A load balancer 302 may provide initial setup functions, including authentication and setup, then a session may be created between the server 304 and client 308 where the client 308 may control the server 304 or an application running on the server 304.

A client 306 may send a request for a web page in block 308 to the load balancer 302. The load balancer 302 may receive a request in block 310, then request authentication credentials in block 312. The authentication request may be received by the client 306 in block 314, and may send the credentials in block 316.

The load balancer 302 may receive authentication credentials in block 318 and verify the credentials in block 320. In some cases, the credentials may be passed to a separate authentication service. After verifying the credentials in block 320, the load balancer 302 may send a web page with server information and authentication token in block 322 to the client 306.

In some cases, the load balancer 302 may also send set up or configuration instructions to the server 304, while in other cases, such configuration instructions may be included in the web page with server information. In this example, a web page is a shorthand notation for instructions for how to access the server 304 from the client 306. In many cases, such instructions may be embodied in an HTML document, which may include executable scripts or other instructions.

The web page may be received in block 324 by the client 306. The client 306 may sent a request with the authentication token in block 326, which may be received by the server 304 in block 328. The server 304 may verify the token in block 330, and may send client executable code in block 332 to the client 306. The client 306 may receive the client executable code in block 334 and may begin execution in block 336.

The server 304 may send a video stream in block 340 that may represent the operating system desktop of the server 304, an application executing on the server 304, or some other "live" image of the server 304. The video stream may be received and rendered in block 338. The client 306 may generate and send client data in block 346, which may include keyboard, mouse, and other inputs, which may be received by the server 304 in block 348. The keyboard, mouse, and other inputs may be used to control the application or operating system running on the server 304, and thereby a user of the client 306 may operate the server 304 through a browser.

Figure 4:
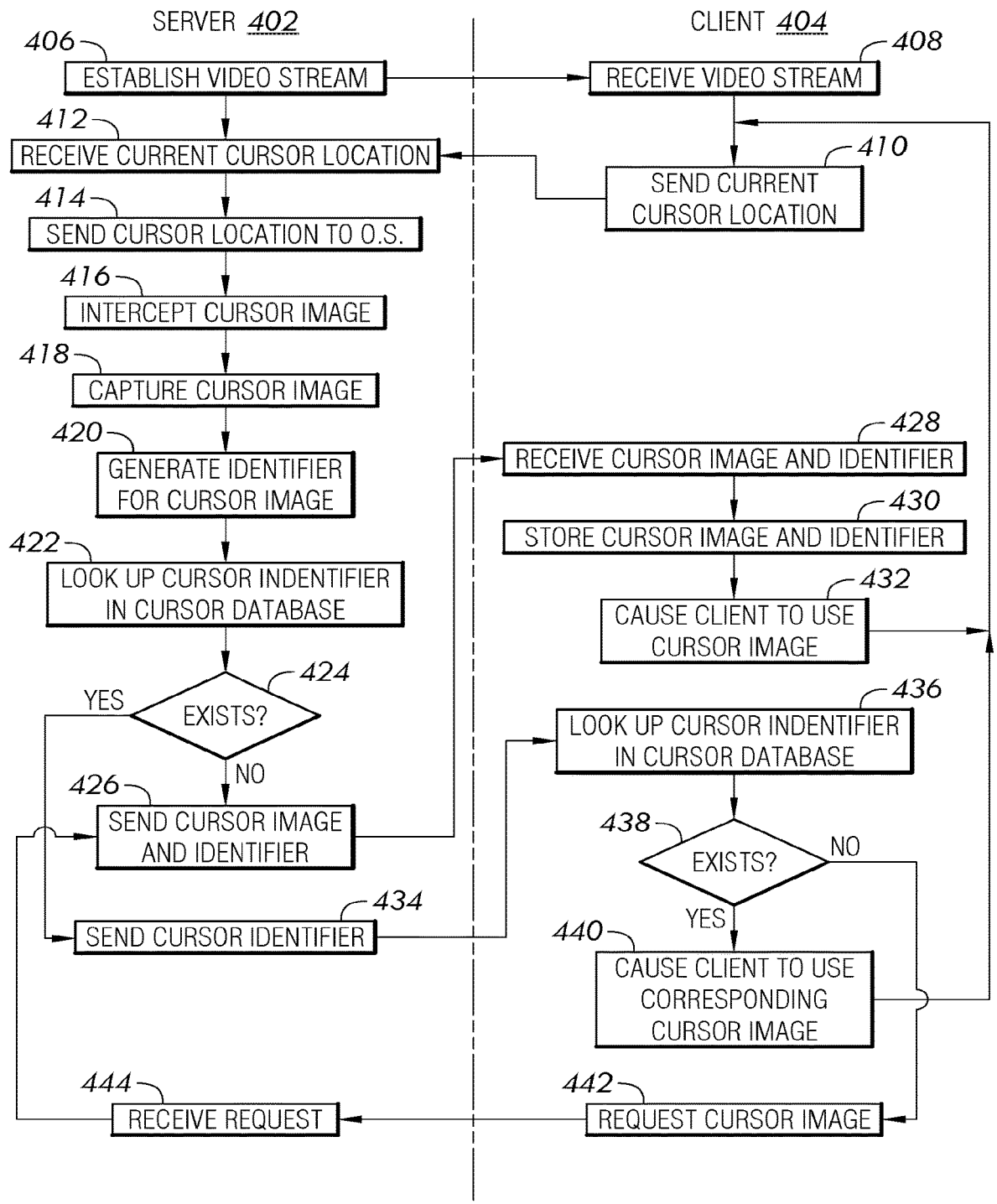
FIG. 4 is a flowchart illustration of an embodiment showing a method for managing Cursors.

FIG. 4 is a flowchart illustration of an embodiment 400 showing a method of handling cursors in a browser-control system of a remote server. Embodiment 400 is a simplified example of a sequence showing a server 402 in the left hand column and a client 404 in the right hand column.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

Embodiment 400 may illustrate a process that may be performed between a server 402 and client 404 when the client 404 may render a cursor image locally, but may be providing input to and controlling the server 402 or at least an application on server 402.

An outbound video stream may be created in block 406 by the server 402 and transmitted to the client 404. The client 404 may receive the video stream in block 408 and may render the video stream within a browser. In block 410, the client 404 may gather and send a cursor location to the server 402, which may receive the cursor location in block 412.

The cursor location may also include interactions or commands that may be executed with the cursor location. Such commands may be a left-click, right-click, center-click, scrolling, or other location-sensitive commands. The cursor location may be sent to the operating system in block 414, along with any commands or other input.

The cursor image generated by the server 402 may be intercepted in block 416. In some cases, the operating system of the server 402 or an application executing on the server 402 may have a signaling system to transmit a cursor image that may be displayed at the location selected by the user. Some applications may have cursor images that may reflect a function, command, setting, or other operational characteristic of the application. Some applications may change cursor images based on the location of the cursor within the application, and such image changes may signify different available operations to the user.

In many cases, a cursor image may have one or more transparent pixels or bits. In some cases, the transparent pixels or bits may be partially transparent.

The server 402 may generate a cursor identifier for the cursor image. The cursor identifier may be any shorthand notation or identifier for a particular cursor image. One mechanism for identifying a cursor image may be to perform a hash function on the image and generate an alpha-numeric or numeric designation. The hash function may be selected such that changes to the image may result in changes to the identifier, thereby signaling that the cursor has changed.

The cursor identifier may be looked up in the cursor database in block 422. If the cursor image does not exist in the cursor database in block 424, the server 402 may send the cursor image and identifier in block 426 to the client 404.

The client 404 may receive the cursor and identifier in block 428 and may store the cursor and identifier in a local cursor storage in block 430. The client may cause the cursor image to be used for the current location of the cursor in block 432 and the process may loop back to block 410.

If the cursor does exist in the server's cursor database in block 424, the cursor identifier may be transmitted in block 434. The client 404 may receive the cursor identifier and may look up the cursor identifier in the cursor database in block 436. If the cursor identifier and corresponding image exists locally in the cursor database in block 438, the client may use the cursor image in block 440.

If the lookup fails in block 438 and the identified cursor is not available locally, the client 404 may request a cursor image in block 442, which may be received by the server 402 in block 444. The server 402 may return to block 426 and may transmit the cursor image and identifier.

In some cases, a cursor image may be defined for a specific region within a rendered area of a video stream. For example, when a cursor hovers over a text object, the cursor may be changed to a text editing cursor, but such a cursor may be only valid for the region of a text box. Such a map, overlay, or other description of where certain cursors may be valid may be generated on the server 402 and transmitted to the client 404 in some embodiments. In some cases, the server 402 may generate a map of the rendered area and may define which cursors may be valid at various locations within the map. Some such systems may have a default cursor that may be used wherever a special cursor may not be defined.

Figure 5:
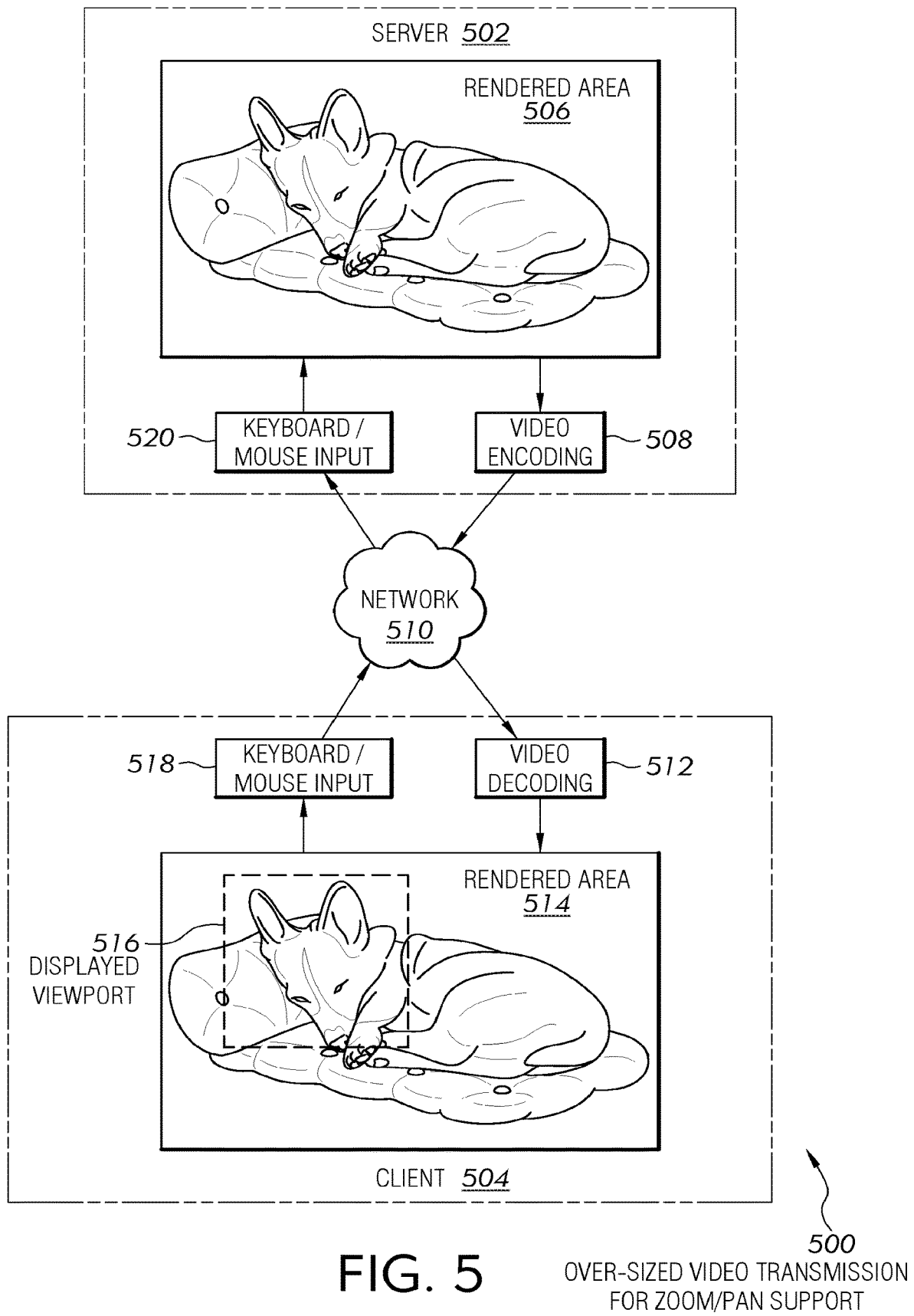
FIG. 5 is a diagram illustration of an embodiment showing an oversized video transmission for zoom/pan support.

FIG. 5 is a diagram illustration of an example embodiment 500 showing an over-sized video transmission from a server 502 to a client 504. The over-sized video transmission may be a higher resolution or larger size than may be displayed in a browser on the client 504.

Embodiment 500 may illustrate one use case of an over-sized video transmission. An over-sized video transmission may be any configuration where the server 502 may transmit a video stream that may be larger than the displayed area on the browser of the client 504. The over-sized video in this example may be useful for panning and zooming the video stream rendered on the client 504.

In such a configuration, any zooming or panning of the video stream may be performed on the client 504, which may be faster and more responsive than if the zoom or pan commands were transmitted to the server 502 and updates made to the rendered video stream.

A zoom command may expand or contract the displayed area or viewport rendered in a browser on the client 504. A pan command may allow the client 504 to move the displayed viewport horizontally or vertically within the rendered area of the video.

Zoom and pan commands may be issued on the client 504 by a user. In some cases, the user may have a mouse navigation mechanism, such as a special mouse button and movement commands, or a mouse movement in conjunction with a keyboard command, such as a shift key, alt key, or control key. In other cases, a zoom or pan command may be issued by moving the device, such as through accelerometer inputs when a user may move a device, such as a mobile device, through space.

A server 502 may generate a rendered area 506, which may be captured and encoded into video using a video encoder 508. The video stream may be transmitted over a network 510 to a client 504. The client 504 may have a video decoder 512 and may generate a rendered area 514. The rendered area 514 may be the same size as the rendered area 506 on the server.

The client 504 may display a subset of the rendered area 514 as a displayed viewport 516. The displayed viewport 516 may be moved around the rendered area 514 by zoom and pan commands issued by a user.

The client 504 may capture keyboard, mouse, and other inputs 518, which may be transmitted over the network 510 to the server 502. The server 502 may use the keyboard, mouse, and other inputs 520 to input to the application, causing the rendered image of the application or operating system to be updated.

The cursor locations transmitted back and forth between the client 504 and server 502 may be translated to compensate for the difference between the client's displayed viewport 516 and the rendered area 514. Typically, the server 502 may receive cursor locations based on an absolute horizontal and vertical location from one of the corners of the rendered area 506. However, the cursor of the client 504 may be limited to be within the displayed viewport 516. The client 504 may translate the cursor input captured on a browser to the rendered area dimensions in the keyboard, mouse, or other input 518 that may be transmitted to the server 502.

Figure 6:
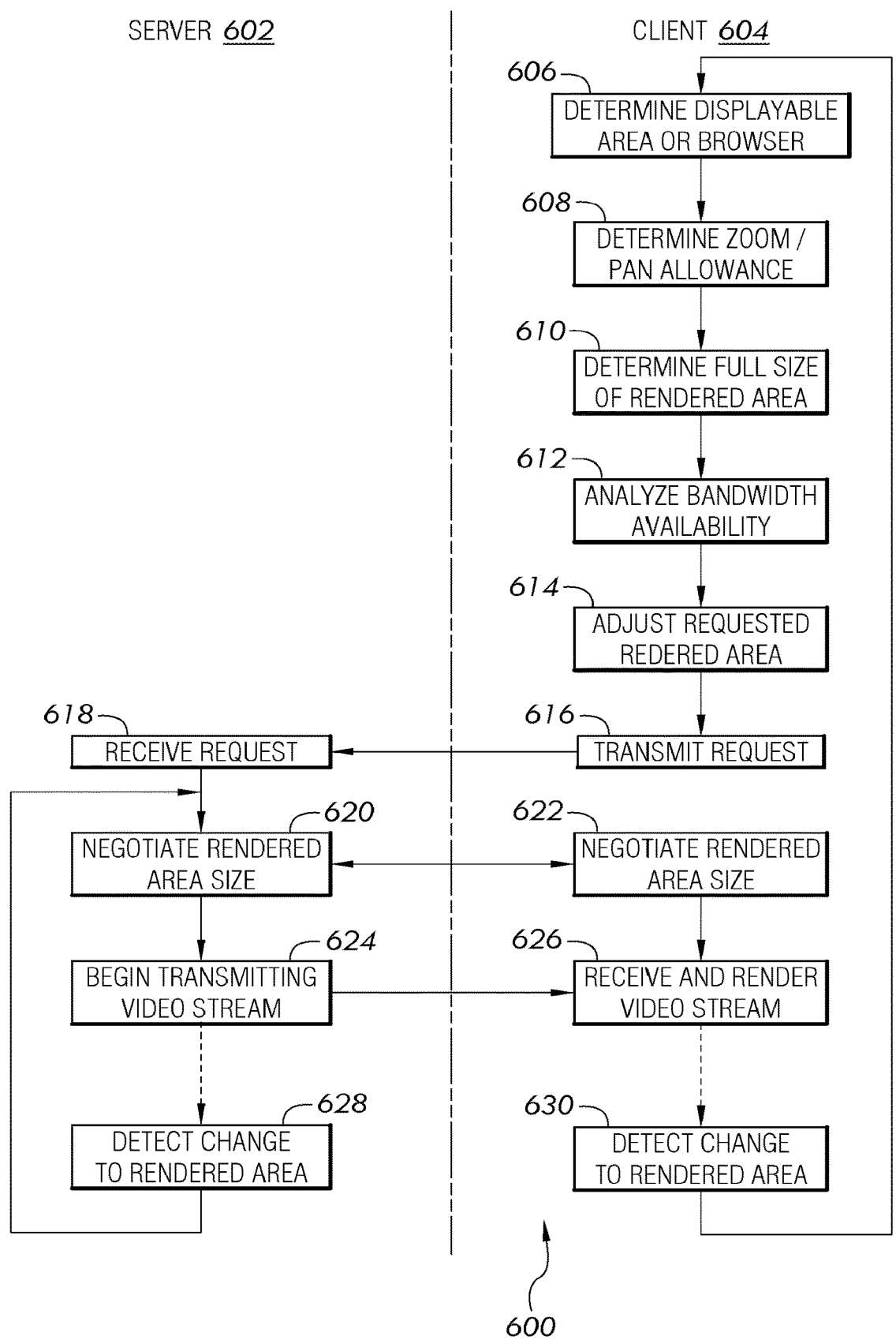
FIG. 6 is a flowchart illustration of an embodiment showing a method for selecting and adjusting a rendered area.

FIG. 6 is a flowchart illustration of an embodiment 600 showing a method of negotiating and changing the rendered area of a video stream that may be transmitted and displayed on a client. Embodiment 600 is a simplified example of a sequence showing a server 602 in the left hand column and a client 604 in the right hand column.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

Embodiment 600 may illustrate one method by which the rendered area of a video stream generated by a server 602 may be selected and changed.

A client 604 may determine the displayable area on a browser in block 606. A zoom/pan allowance may be determined in block 608, which may determine how much extra size of the video stream may be allocated for locally performed zoom and pan commands.

For some applications, no zoom or pan allowance may be used. Such applications may typically take up the entire browser area and may not zoom or pan within the browser screen. For other applications, notably first person games, the zoom or pan actions may be a large part of the application's operation. Such applications may be allocated a large zoom or pan allowance.

The full size of a rendered area may be determined in block 610 from the zoom or pan allowance and the displayable area of the browser. In some cases, even without a zoom or pan allowance, a requested rendered area may be larger or smaller than the viewable browser area. For example, some systems may be configured to downsample at the browser, where a larger rendered area may be transmitted and the video may be shrunk to meet the viewable area on the browser. Such configurations may be useful when the downsampling may offer increased resolution, especially with lossy video compression. In a typical downsampled configuration, the rendered area may be two times the dimensions of the browser viewport.

In another example, a browser may be configured to upsample a video stream, such that the displayed area on the browser may be larger than the video rendered area. In such a situation, the browser may expand the video to fit the browser screen. Such configurations may be useful for applications where less precise rendering may be acceptable or where the network bandwidth may be limiting.

In block 612, the network bandwidth may be analyzed to determine whether a video stream of a certain size may be possible. Any adjustments to the requested rendered area may be made in block 614.

The client 604 may transmit a request in block 616, which may be received in block 618 by the server 602. The server 602 and client 604 may negotiate the rendered area size in blocks 620 and 622, respectively. The negotiation may involve identifying certain predetermined sizes that may be optimized on the server 602 or other considerations. After negotiation, the server 602 may begin transmitting a video stream in block 624, which may be received and rendered in block 626.

When the server 602 may detect that a change to the rendered area may be advisable in block 628, the server 602 may initiate a negotiation in block 620.

Similarly, when the client 604 may detect that a change to the rendered area may be advisable in block 630, the process may go back to block 606 to consider various factors that may be changed.

client 604 may determine that a change to the rendered area may be advised under several circumstances. For example, the client 604 may determine that a user may be exceeding the limits of the available room within the rendered area for zoom or pan commands. In such a case, the client 604 may request that the rendered area be expanded.

In another example, a client 604 may detect that network bandwidth may be decreasing, causing the client 604 to request a smaller rendered area. In yet another example, the user may reposition the browser on the client 604, which may cause the browser's displayed viewport to change size or aspect ratio. Such a change may indicate that a rendered area change may be in order.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. An ultra-low latency server system comprising:
a first hardware platform comprising a processor and an operating system;
a first network connection;
an ultra-low latency remote service executing within said operating system and on the processor, wherein the processor causes the ultra-low latency remote service to:
receive a rendered image of an application executing on the processor, the rendered image comprising a plurality of frames;
remove a cursor image from each frame of the plurality of frames of the rendered image;
generate a video stream from the rendered image using video compression and encoding techniques that use data from one or more frames to compress information in later frames, whereby latency is introduced into the system, the video compression and encoding techniques having a configuration setting that facilitate adjusting the encoding technique;

transmit the video stream over the first network connection to a remote browser operating on a client device;

wherein the ultra-low latency server system is configured to establish the first network connection by receiving a connection request from the client device comprising the remote browser having a JavaScript engine, and transmitting connection instructions to the remote browser, wherein the connection instructions comprise a hyper-text markup language (HTML) page and executable JavaScript and cursor information, the cursor information comprising cursor location information representing a location of the cursor in each frame of the plurality of frames before the cursor image was removed and cursor image information comprising a bitmap of the cursor to facilitate rendering of the cursor by the remote browser;

wherein embedding the executable JavaScript in the HTML page permits the remote browser on the client device to execute the application of the processor without creating, supporting, and downloading native applications that would be specific to each hardware and software platform of any client device;

wherein the video compression and encoding techniques are tuned to minimize buffering by using a minimum number of the plurality of frames during a compression process to reduce the latency in the system;

wherein the connection instructions further comprise executable code that, when executed, captures at least a portion of the cursor information within the remote browser, receives the cursor information from the remote browser; and transmits the cursor information to the application;

whereby, in use, a user of the remote browser experiences real-time or near real-time control of the application executing on the processor of the first hardware platform.

2. The ultra-low latency server system of claim 1, wherein the processor further causes the remote service to:
receive the connection request from the remote browser, the connection request comprising displayable screen dimensions on the remote browser.

3. The ultra-low latency server system of claim 2, wherein the displayable screen dimensions are smaller than dimensions of the rendered image.

4. The ultra-low latency server system of claim 2, wherein the processor further causes the remote service to:
generate the video stream to match the displayable screen dimensions.

5. The ultra-low latency server system of claim 2, wherein the processor further causes the remote service to:
cause the rendered image to match the displayable screen dimensions.

6. The ultra-low latency server system of claim 2, the remote browser being configured to pan and/or zoom the video stream.

7. The ultra-low latency server system of claim 2, wherein the processor further causes the remote service to:
receive updated displayable screen dimensions from the remote browser; and
change the video stream to match the updated displayable screen dimensions.

8. The ultra-low latency server system of claim 1, wherein the processor further causes the remote service to:
transmit a cursor identifier, the cursor identifier identifying a displayed cursor by the application.

9. The ultra-low latency server system of claim 8, wherein the processor further causes the remote service to:
transmit a cursor boundary, the cursor boundary identifying a region within the video stream for which the cursor identifier is valid.

10. The ultra-low latency server system of claim 9, wherein the video stream comprises an audio channel.

11. The ultra-low latency server system of claim 2 further comprising:
a connection management system executing the processor, the connection management system that:
receives, and optionally authenticates, the connection request from the remote browser, the connection request being for remote access to an application server through the remote browser, wherein the connection request comprises the displayable screen dimensions for the remote browser;
determines a set of configuration settings for the application server;
causes the application server to be configured with the set of configuration settings;
determines a set of connection settings for the remote browser; and
transmits the set of connection settings to the remote browser;
the connection management system optionally comprising a load balancer that selects the application server from a plurality of application servers.

12. A method performed on a processor of an ultra-low latency server system, said method comprising:
receiving a rendered image of an application, the rendered image comprising a plurality of frames;
removing a cursor image from each frame of the plurality of frames of the rendered image;
generating a video stream from the rendered image using video compression and encoding techniques that use data from one or more frames to compress information in later frames, whereby latency is introduced into the system, the video compression and encoding techniques having configuration settings that may permit adjusting the video compression and encoding techniques;
transmitting the video stream over a first network connection to a remote browser operating on a client device;
wherein the ultra-low latency server system is configured to establish the first network connection by receiving a connection request from the client device comprising the remote browser having a JavaScript engine, and transmitting connection instructions to the remote browser, wherein said connection instructions comprise a hyper-text markup language (HTML) page and executable JavaScript and cursor information, the cursor information comprising cursor location information representing a location of the cursor in each frame of the plurality of frames before the cursor image was removed and cursor image information comprising a bitmap of the cursor to facilitate rendering of the cursor by the remote browser, wherein embedding the executable JavaScript in the HTML page permits the remote browser on any client device to execute the application without creating, supporting, and downloading native applications that would be specific to each hardware and software platform of any client device;

wherein in the video compression and encoding techniques are tuned to minimize buffering by using a minimum number of the plurality of frames during a compression process to reduce the latency in the system, wherein connection instructions further comprising executable code, said executable code that, when executed, captures at least a portion of said cursor information within said remote browser, receiving cursor information from said remote browser; and transmitting said cursor information to said application.

13. The method of claim 12, the application being executed on the processor.

14. The method of claim 12 further comprising:
receiving the connection request from the remote browser, the connection request comprising displayable screen dimensions on the remote browser.

15. The method of claim 14 further comprising:
generating the video stream to match the displayable screen dimensions.

16. The method of claim 14, further comprising:
causing the rendered image to match the displayable screen dimensions.

17. A non-transitory computer readable medium, comprising instructions that, when executed by a processor, cause the processor of an ultra-low latency server system to perform operations, comprising:
receiving a rendered image of an application executing on the processor, the rendered image comprising a plurality of frames;
removing a cursor image from each frame of the plurality of frames of the rendered image;
generating a video stream from the rendered image using video compression and encoding techniques that use data from one or more frames to compress information in later frames, whereby latency is introduced into the system, the video compression and encoding techniques having a configuration setting that facilitate adjusting the encoding technique;
transmitting the video stream over a first network connection to a remote browser operating on a client device;
wherein the ultra-low latency server system is configured to establish the first network connection by receiving a connection request from the client device comprising the remote browser having a JavaScript engine, and transmitting connection instructions to the remote browser, wherein the connection instructions comprise a hyper-text markup language (HTML) page and executable JavaScript and cursor information, the cursor information comprising cursor location information representing a location of the cursor in each frame of the plurality of frames before the cursor image was removed and cursor image information comprising a bitmap of the cursor to facilitate rendering of the cursor by the remote browser;

wherein embedding the executable JavaScript in the HTML page permits the remote browser on any client device to execute the application of the processor without creating, supporting, and downloading native applications that would be specific to each hardware and software platform of any client device;

wherein the video compression and encoding techniques are tuned to minimize buffering by using a minimum number of the plurality of frames during a compression process to reduce the latency in the system;

wherein the connection instructions further comprise executable code that, when executed, captures at least a portion of the cursor information within the remote browser, receives the cursor information from the remote browser; and transmits the cursor information to the application;

whereby, in use, a user of the remote browser experiences real-time or near real-time control of the application executing on the processor of the ultra-low latency server system.

18. The non-transitory computer readable medium of claim 17, wherein the operations further comprise:
receiving the connection request from the remote browser, the connection request comprising displayable screen dimensions on the remote browser.

19. The non-transitory computer readable medium claim 18, wherein the displayable screen dimensions are smaller than dimensions of the rendered image.

20. The non-transitory computer readable medium claim 18, wherein the operations further comprise:
generating the video stream to match the displayable screen dimensions.

* * * * *